United States Patent [19]

Hartig

[11] 4,121,112
[45] Oct. 17, 1978

[54] PULSE GENERATOR

[76] Inventor: Gunter Fritz Hartig, Hansastrasse 29, Karlsruhe, Fed. Rep. of Germany, D-7500

[21] Appl. No.: 699,488

[22] Filed: Jun. 24, 1976

[30] Foreign Application Priority Data

Jul. 2, 1975 [CH] Switzerland .................. 8604/75

[51] Int. Cl.² ........................................... H02P 9/00
[52] U.S. Cl. .................................. 307/106; 310/168; 322/47; 322/90; 324/173
[58] Field of Search ............... 324/166, 164, 163, 173, 324/179; 307/106, 233 A; 310/168, 169, 170, 155, 153; 322/47, 90; 361/236, 240; 340/195, 196, 199; 328/133, 134

[56] References Cited

U.S. PATENT DOCUMENTS

| | | | |
|---|---|---|---|
| 3,683,285 | 8/1972 | Wild | 328/133 |
| 3,891,861 | 6/1975 | Weber et al. | 307/106 |
| 3,930,201 | 12/1975 | Ackermann et al. | 310/168 |
| 4,013,945 | 3/1977 | Grosso | 324/173 |

FOREIGN PATENT DOCUMENTS 2,416,056  11/1974  Fed. Rep. of Germany.

Primary Examiner—Robert K. Schaefer
Assistant Examiner—M. K. Mutter
Attorney, Agent, or Firm—Toren, McGeady and Stanger

[57] ABSTRACT

A pulse generator for the generation of pulses which are synchronously associated with the movement of a mechanical part comprises a toothed element, the teeth of which run past a pick-up head, the pick-up head comprising a first winding fed by a carrier frequency, which produces a field which is modulated by the teeth of the element and a second winding in which a voltage is induced by the modulated field, the induced voltage is supplied to a phase discriminator which produces a pulse sequence having a keying ratio proportional to the relative phase position of the induced voltage and the carrier frequency and the pulse sequence is fed to an integration element which produces a voltage signal proportional to the keying ratio.

8 Claims, 8 Drawing Figures

PULSE GENERATOR

BACKGROUND OF THE INVENTION

The invention relates to a pulse generator for producing pulses which are synchronously associated with the movement of a mechanical element.

For the control of machines, in particular machines having rotating parts, electronic auxiliary devices are increasingly used, which require pulses for the synchronisation of the control orders or measurements given by them with the movement of the machine which are associated synchronously with this movement, for example rotational movement. For example, most auxiliary devices, in particular digital control systems, work incrementally, i.e. they require in each case a synchronous pulse to maintain the synchronisation between the machine and the control system.

Particular requirements are made of pulse generators of this type in motor vehicle design, since in this case the pulse generator preferably works in connection with the flywheel gearing, which is subject to a high degree of vibration and is located in the region of the clutch housing, in which very high temperatures can be expected. Moreover, if the pulse generator works in conjunction with an auxiliary device for the control of the injection and/or ignition of the internal combustion engine of the motor vehicle, it must possess a very low lower rotational speed limit, so that even during the starting of the internal combustion engine the generation of the pulses necessary for synchronisation and control is guaranteed.

The inductive pulse generators used hitherto for engine diagnosis, which are also termed "inductive generators" do not provide trouble free working at low rotational speeds and the use of pulse generators with field plates fails for reasons of temperature. Moreover, in each case two such pulse generators would have to be used of which one produces the actual pulses required for the control system itself while the other in each case supplies the synchronous pulse with which the synchronisation between the engine and the auxiliary device is maintained. In the latter case, the synchronous pulse in addition to the pulses required for control in the case of rotating engines is obtained by an additional angle marking in the double track method, such as is described for example in German Pat. No. 2,010,999, in which the synchronisation pulses are termed "auxiliary pulses".

SUMMARY OF THE INVENTION

The object of the invention is to provide a pulse generator which in itself takes over the function of the two pulse generators mentioned and at the same time is easy to exchange and is independent of temperature.

According to the invention, in a pulse generator comprising a toothed element, the teeth of which run past a pick-up head and modulate a field in this head, for the production of which a first winding fed by a carrier frequency generator is provided in the pick-up head, the pick-up head also comprising a second winding in which a voltage is induced by the field modulated by the teeth, the voltage being converted to pulses by a switching arrangement. The voltage which is induced in the second winding by the field modulated by the teeth, is supplied to a phase discriminator, which at its output delivers a pulse sequence with a keying ratio which is proportional to the relative phase position of the induced voltage and the carrier frequency dependent on the material located momentarily in front of the pick-up head in each case, and the pulse sequence is supplied to an integration element, which supplies an integration voltage which is proportional to the keying ratio.

In particular, the pulse generator can be designed so that the material of a first tooth or several first teeth differs from the material of the other teeth in such a way that when passing a first tooth there on induced voltage is produced at the pick-up head which is displaced in its phase position by a predetermined minimum amount in relation to the phase position of the induced voltage resulting when the other teeth pass the pick-up head, two threshold value switches being connected to the integration element to separate the differing integration voltages resulting therefrom.

The term "first" tooth or teeth does not refer to the position of this tooth or teeth within the sequence of teeth, but this first tooth or teeth can be arranged at any point within the entire sequence of teeth; the term "first" tooth or teeth has therefore only been used for the purpose of differentiating from the remaining teeth of the totality of teeth used in the pulse originator.

The last mentioned proposal is preferably realised by providing the first tooth or teeth with an eddy current loss-free, magnetically conductive material or by them consisting of this material or containing this material, whereas the other teeth consist of eddy current dissipative material.

The eddy current loss-free material does not need to be absolutely free of losses by eddy current, but it is sufficient that it has significantly lower losses than the eddy current dissipative material. The term "eddy current loss-free" is therefore to be understood as being relative. By an eddy current loss-free material one should therefore also understand an eddy current dissipative material provided with at least one gap, since such a gap reduces the eddy current losses, so that it can therefore be sufficient to produce all the teeth from an eddy current dissipative, magnetically conductive material and to provide those teeth which should be eddy current loss-free with an air gap or several air gaps. Differing eddy current losses can however for example also be achieved by differing heat treatment of the same material. Such measures for the reduction of the eddy current losses are in themselves known from transformer design.

When two threshold value switches are provided as described above, then these threshold value switches can be designed so that one of the threshold value switches responds to the maxima of the integration voltage while the other responds to the minima of the integration voltage.

The pick-up head of the pulse generator according to the invention can be designed in detail so that the windings of the pick-up head are provided on a ferrite body, which has an outer casing part on which the first winding and a part of the second winding are located and which has a central part arranged concentrically with the outer casing part which carries the other part of the second winding.

DESCRIPTION OF THE PREFERRED EMBODIMENTS

Figure 1:
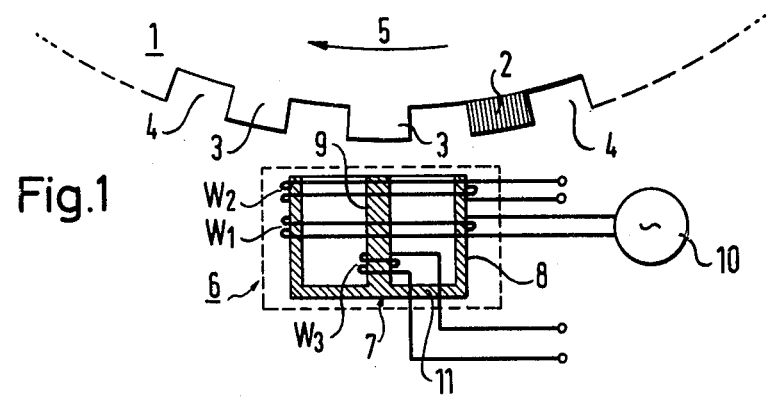
FIG. 1 shows a schematic partially sectional side view of a part of a preferred embodiment of a pulse generator according to the invention with an associated pick-up head and a frequency generator.

Reference should first be made to FIG. 1, which shows a part of an element 1 in a side view, having a first tooth 2 and further teeth 3 and interstices 4 between the teeth.

The element 1 moves in the direction of the arrow 5. Generally, the element can have any shape, provided with a row of teeth and interstices, for example a rod provided with teeth, moving to and fro synchronously to the movement of a machine to be controlled or a part of this machine. In particular, the originator can be a wheel provided with teeth, the arrow 5 then indicating the direction of rotation of the wheel. Such wheels provided with teeth may be used as elements for the control of internal combustion engines.

Figure 2:
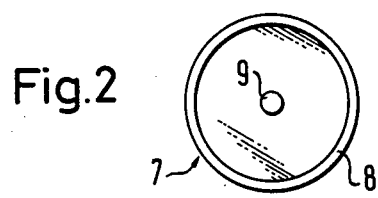
FIG. 2 shows a plan view of the ferrite body provided in the pick-up head of FIG. 1.

The teeth 2, 3 and the interstices 4 of the element 1 move past a pick-up head 6, which is provided with a ferrite body 7. A plan view of the ferrite body 7 is shown in FIG. 2 and as can be seen from FIGS. 1 and 2 together, it possesses an outer casing part 8 and a central part 9, the latter being arranged concentrically to the casing part 8 and connected to it. A first winding $W_1$ is provided on the outer casing part 8 which is supplied by a carrier frequency generator 10. In addition, on the outer casing part 8, a part $W_2$ of a second winding is provided having a second part $W_3$ carried by the central part 9. The second winding is therefore formed by the two winding parts $W_2$ and $W_3$ and is therefore designated as $W_2$, $W_3$ in the following.

A field is excited in the pick-up head 6 by the carrier frequency generator 10 via the first winding $W_1$ so that this winding $W_1$ is also designated in the following as the exciter winding. The field generated by the exciter winding runs in such a way that the teeth 2, 3 and the interstices 4 modulate this field, therefore they run through this field.

A voltage is induced in the second winding consisting of the two winding parts $W_2$ and $W_3$ by the field produced by the exciter winding $W_1$ in conjunction with the carrier frequency generator 10 and modulated by the teeth 2, 3 and the interstices 4, so that this second winding is subsequently termed the measurement winding. The winding part $W_2$ is connected in the opposite direction in relation to the winding part $W_3$. In the case of an exciter winding $W_1$ earthed on one side, the winding part $W_2$ of the measurement winding wound around the outer casing part 8 can be identical to the exciter winding, so that then therefore the windings $W_1$ and $W_2$ are formed by a single winding.

The carrier frequency of the carrier frequency generator 10 is generally between 50 and 500 kHz.

It should be mentioned at this point that in the case of the ferrite body 7 as shown in FIGS. 1 and 2, the outer casing part 8 is in the form of a hollow cylinder, which is sealed on one side by a floor 11, in the centre of which, standing on the floor 11, the solid cylindrical central part 9 is arranged concentrically with the hollow cylindrical casing part 8, the parts 8, 9 and 11 being in one piece with one another.

The tooth 2 is made of an eddy current loss-free, magnetically conductive material, for example ferrite. In the present case the entire tooth 2 is formed from ferrite but it can be sufficient to form the tooth 2 from the same material as the teeth 3 and for example only to secure some ferrite material to the tooth 2 or to provide it in a corresponding recess in the tooth 2. It is of decisive importance that the quantity and the method of fitting the ferrite material on or in the tooth 2 is sufficient to effect a clearly different phase shift of the voltage induced in the measurement winding in relation to the carrier frequency voltage, from the phase shift caused by the teeth 3. The teeth 3 consist of an eddy current dissipative, magnetically conductive material, for example iron.

In general it can be said that the phase shift between the carrier frequency voltage $U_1$ and the voltage $U_2$ generated in the measurement winding, which is designated in the following also as the measurement voltage, on the passage of a tooth 3 of eddy current dissipative, magnetically conductive material at the pick-up head 6 is in the range between 0° and 90°, while this phase shift on the passage of the tooth 2 of eddy current loss free, magnetically conductive material lies in the range between 90° and 180°.

The method of working of the pulse generator shown in FIG. 1, is such that on the passing of the teeth 3 consisting of iron, conditioned by the eddy current losses in the ferrite body 7, a phase-modulated field arises, which induces a corresponding voltage in the winding parts $W_2$, $W_3$, of which the basic proportion is compensated by the counter voltage from the winding part $W_2$, so that a measurement voltage $U_2$ having a relatively large phase variation results in relation to the voltage $U_1$ delivered by the carrier frequency generator 10, which is designated below as the exciter voltage.

Figure 5:
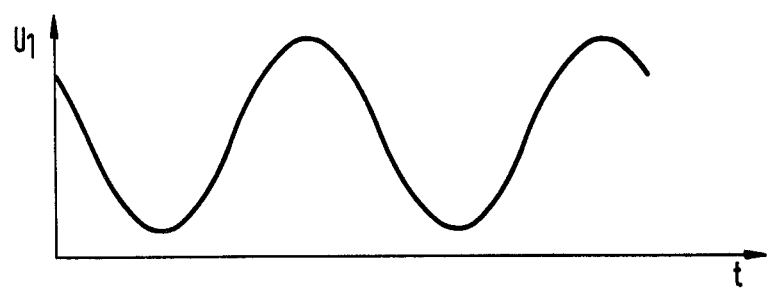
FIGS. 5 to 8 show plots of different voltages which occur in the switching arrangements of FIGS. 3 and 4 against time.
Figure 5:
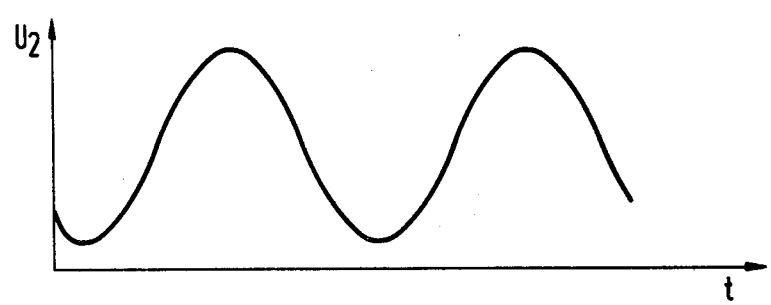

In FIG. 5 the exciter voltage $U_1$ and the measurement voltage $U_2$ are plotted against time, the time values of the abscissa being equal. This instance relates to the passing of a tooth 3 consisting of iron at the pick-up head 6, so that a phase shift of 90° between the two voltages results, as can be seen from FIG. 5. This phase shift between the exciter voltage $U_1$ and the measurement voltage $U_2$ is significantly greater when the tooth 2 consisting of ferrite material moves past the pick-up head 6, and can for example be 180°. In order now firstly to obtain a pulse sequence from the voltages produced by the teeth 2 and 3, which is associated synchronously with the teeth 2 and 3, and secondly in each case to obtain an individual pulse which is associated synchronously with the tooth 2, and 3, and secondly in each case to obtain an individual pulse which is associated synchronously with the tooth 2, thus always appears when the tooth 2 passes the pick-up head 6, a switching arrangement is used which is shown schematically in FIG. 3. In this switching arrangement as already mentioned above, the winding part $W_2$ of the measurement winding in this case to be earthed on one side is used simultaneously as the exciter winding, so that therefore a separate winding $W_1$ can be dispensed with.

Figure 3:
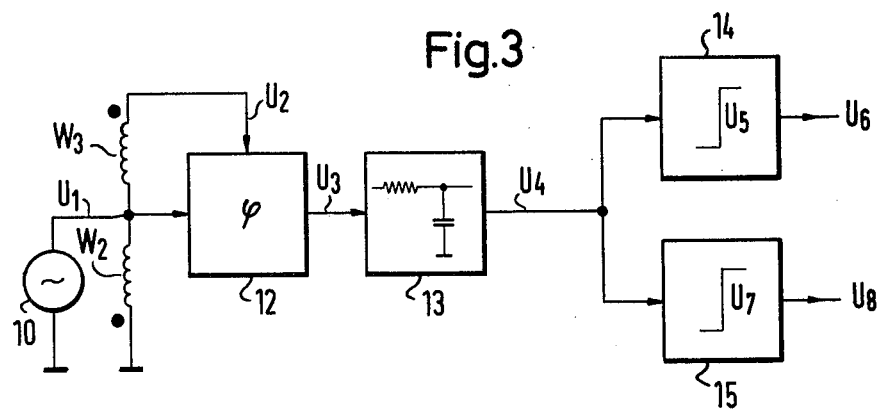
FIG. 3 shows a block circuit diagram of the switching arrangement of a pulse generator.
Figure 6:
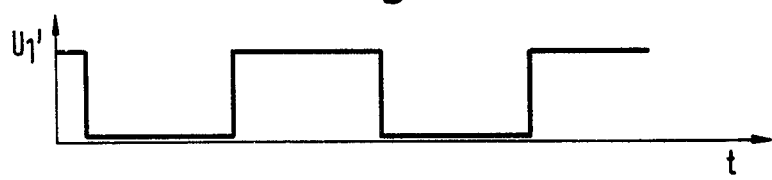
Figure 6:
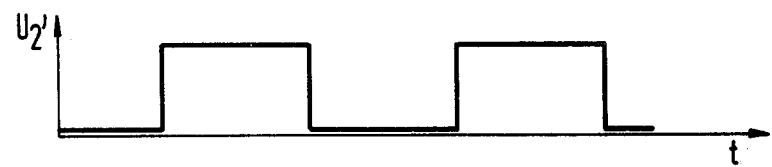
Figure 6:
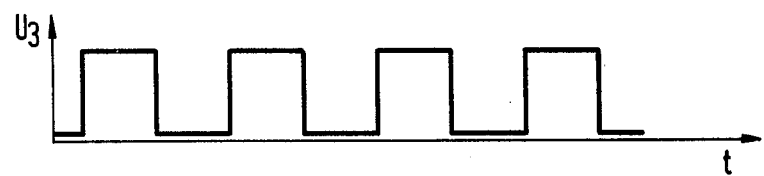

As shown in FIG. 3, the exciter voltage $U_1$ and the measurement voltage $U_2$ are supplied to a phase discriminator 12. In this phase discriminator 12 an output signal in the form of a voltage $U_3$ is obtained from the two voltages $U_1$ and $U_2$, of which the plot against time is shown in the bottom part of FIG. 6. This voltage signal $U_3$, as can be seen from the last mentioned Figure, comprises a series of square-wave pulses. The keying ratio of these square-wave pulses is proportional to the relative phase position of both voltages $U_1$ and $U_2$ to one another. These ratios can be seen from the bottom part of FIG. 6 together with the two upper parts of this Figure. The voltages $U_1$ and $U_2$ are converted in the phase discriminator 12 firstly into square-wave voltages, $U_1'$ and $U_2'$, which constitute two square wave pulse sequences identical but shifted in relation to one another in their phase position. If then an output signal occurs in the phase discriminator 12 only during the time in which both square wave pulses of the voltage $U_1'$ and also square wave pulses of the voltage $U_2'$ are present, then the voltage $U_3$ is obtained so that therefore the interstices between the square wave pulses of the voltage $U_3$ become smaller to the benefit of the pulses of this voltage in the region of the phase shift between 0° and 180°, the greater the phase shift between $U_1$ and $U_2$ or $U_1'$ and $U_2'$.

Figure 7:
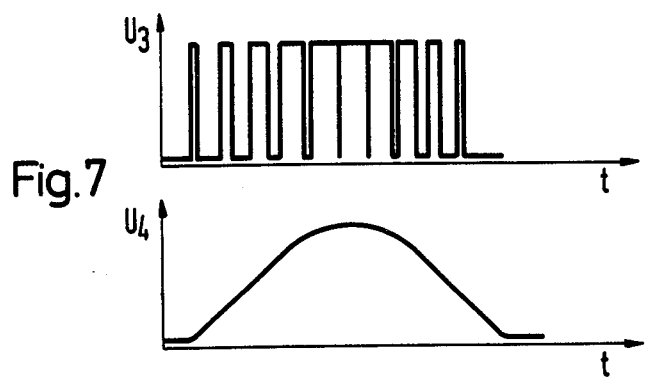
Figure 8:
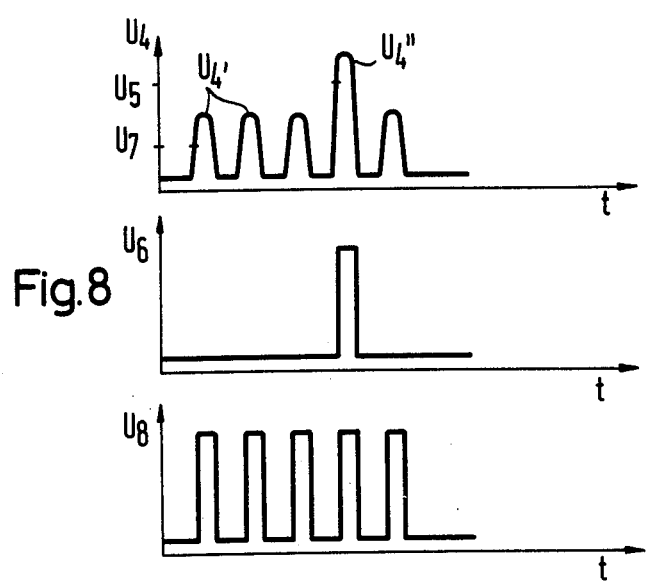

The voltage $U_3$ is fed to an integration element 13 at the output of which an analogue voltage $U_4$ is produced whose amplitude is proportional to the relative phase position of the exciter voltage $U_1$ and the measurement voltage $U_2$. In FIG. 7 the voltage $U_3$ for the case of a tooth 2 consisting of ferrite passing the pick-up head 6 and the resultant analogue voltage $U_4$ are plotted against time $t$. The analogue voltage $U_4$ which results when a plurality of iron teeth 3 and a tooth 2 of ferrite pass the pick-up head 6, is shown in its curve in respect of time in addition in the upper part of FIG. 8. The small voltage peaks $U_4'$ correspond to the passage of the iron teeth 3, while the large voltage peaks $U_4''$ correspond to the passage of a tooth 2 consisting of ferrite at the pick-up head 6.

The voltage $U_4$ is then fed to two threshold value switches 14 and 15 the threshold value switch 14 being adjusted to a threshold value voltage $U_5$ which is higher than the maximum value of the voltage peaks $U_4'$ and lower than the maximum voltage peak $U_4''$, while the threshold value switch 15 is adjusted to a threshold voltage value $U_7$, which is lower than the maximum voltage peaks $U_4'$. These threshold voltage values are indicated in the upper part of FIG. 8.

As a result the threshold value switches 14 and 15 deliver output voltages $U_6$ or $U_8$ at the maxima and minima of the analogue voltage $U_4$ delivered by the integration element 13, the high voltage peaks $U_4''$ being designated as maxima while the lower voltage peaks $U_4'$ are designated as minima. The voltages $U_6$ and $U_8$ are plotted against time in the two lower parts of FIG. 8 and from these can be seen that the individual pulse is obtained as the voltage $U_6$ which arises as a result of the greater phase shift caused by the ferrite tooth 3 of the element 1 in the form of a toothed wheel, while as the voltage $U_8$ pulses are obtained which represent all the teeth 2 and 3 of the originator 1.

Figure 4:
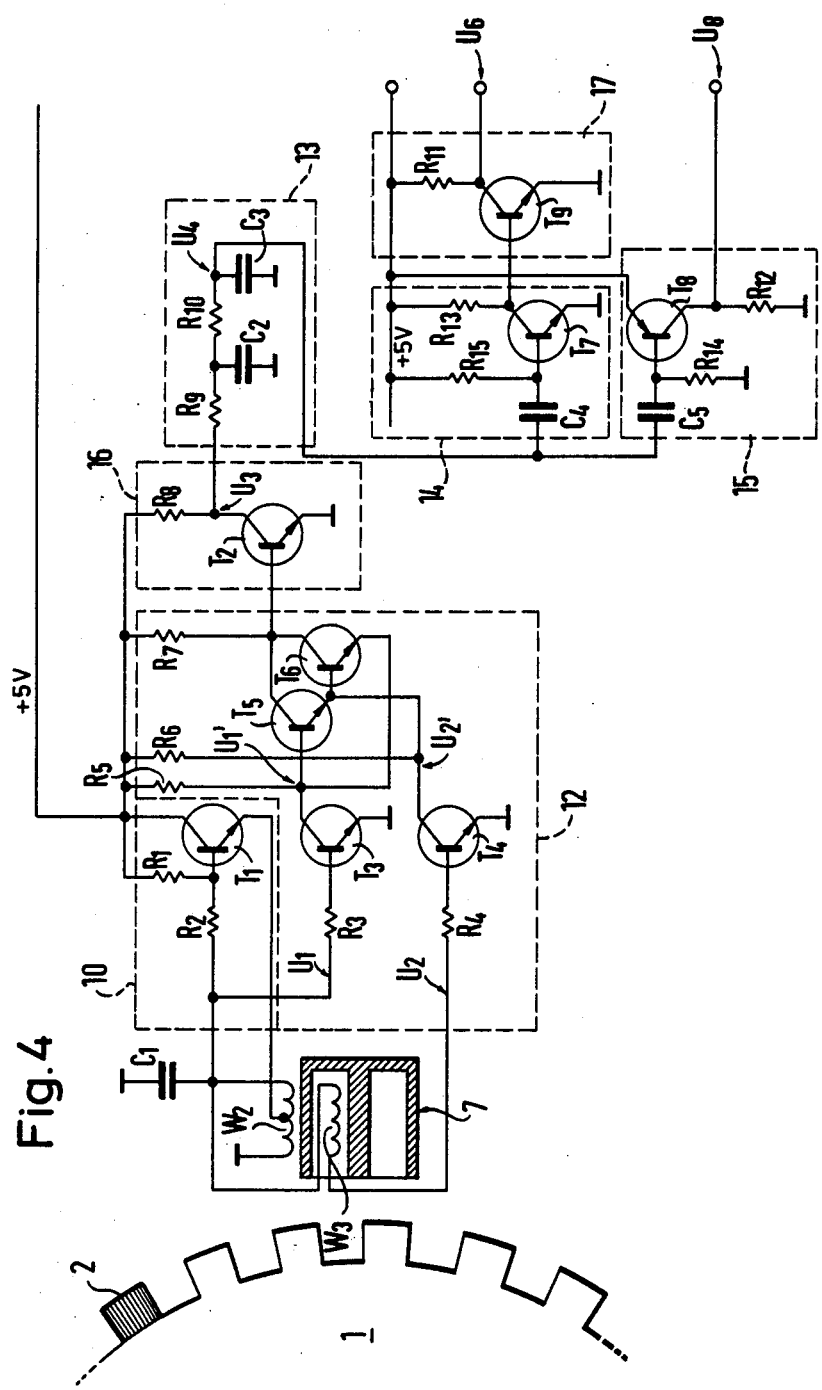
FIG. 4 shows an embodiment of a switching arrangement of the pulse originator together with a toothed element, a pick-up head and a carrier frequency generator.

A possible special switching arrangement of the basic switching arrangment shown schematically in FIG. 3 is shown in FIG. 4, being described in more detail in the following.

A transistor $T_1$ connected in known manner having a base voltage divider $R_1$, $R_2$ serves as the carrier frequency generator 10 in conjunction with the resonance circuit on the outer casing of the ferrite body 7, which is formed by the winding $W_2$ and the condenser $C_1$. The measurement voltage $U_2$ from the winding $W_3$ like the exciter voltage $U_1$ (the carrier frequency voltage) passes via resistances $R_3$ or $R_4$ in each case to the base of an isolation amplifier transistor $T_3$ or $T_4$ of the phase discriminator 12, the latter transistors being supported through collector resistances $R_5$ or $R_6$ according to the supply voltage by for example +5 V. The two collectors of the transistors $T_3$ and $T_4$ are connected to the bases or emitters of two further transistors $T_5$ and $T_6$ in such a way that the collector of the transistor $T_4$ is connected to the emitter of the transistor $T_5$ and the base of the transistor $T_6$, and that the collector of the transistor $T_3$ is connected to the base of the transistor $T_5$ and the emitter of the transistor $T_6$. The transistors $T_3$ to $T_6$ constitute an exclusive OR-gate, with the voltages $U_1'$ or $U_2''$ (see FIG. 6) occurring at the outputs of the transistors $T_3$ and $T_4$. The collectors of the transistors $T_5$ and $T_6$ are on the one hand connected via the resistance $R_6$ to the supply voltage and on the other hand they are connected to the base of an inverter transistor $T_6$ of the inverter 16, at the collector of which the voltage signal $U_3$ is available (see FIG. 6), which as a result of the collector resistance $R_7$ varies between zero and +5 V in rectangular form and possesses a keying ratio dependent on the phase position between the measurement voltage $U_2$ and the exciter voltage $U_1$. In the integration element 13 having a limit frequency of for example approximately 20 kHz, formed from the resistances $R_9$ and $R_{10}$ and the capacitors $C_2$ and $C_3$, the keying ratio is converted into an analogue integration voltage $U_4$ (see also the lower part of FIG. 7 and the upper part of FIG. 8), which is supplied via coupling capacitors $C_4$ and $C_5$ which in turn determine the lower limit frequency of the switching arrangement, to the bases of the transistors $T_7$ and $T_8$ of the threshold value switch 14 or 15. The transistor $T_7$ is of the npn type and is only conductive as a result of self rectification at the base-emitter section in conjunction with the base resistance $R_{15}$ at the maxima $U_4''$ (see FIG. 8 above) of the integration voltage $U_4$, which appear as positive pulses (voltage $U_6$, see FIG. 7 middle part) after passing through the inverter transistor $T_9$ of a second inverter 17 at the outer resistance $R_{11}$. The transistor $T_8$ is of the pnp type and becomes conductive at the "negative" minima i.e. at the minima $U_4'$, as a result of which the pulse sequence associated synchronously with the particular angle position of the originator toothed wheel 1 from the voltage pulses $U_8$ (see FIG. 8 lower part) can be collected at the collector resistance $R_{12}$. The resistance $R_{13}$ is the collector resistance of the transistor $T_7$ and the resistance $R_{14}$ is the highly resistant base compensating resistance of the transistor $T_8$.

I claim:

1. A pulse generator for the generation of pulses which are synchronously associated with the movement of a mechanical part, comprising:
    an element provided with teeth;
    a pick-up head having an exciting winding for generating a field, said teeth running past said pick-up head and modulating said field;
    means for providing a carrier frequency voltage for exciting said exciting winding;
    said pick-up head further including a measuring winding in which said field modulated by said teeth induces a measuring voltage;
    circuit means responsive to said measuring voltage for converting said measuring voltage into a pulse sequence, said circuit means including a phase discriminator into which said measuring voltage and said exciting voltage are supplied, said measuring winding including first and second winding parts, one of which being connected in a direction opposite to the other such that said measuring voltage is the voltage difference between a first voltage induced in said first winding part and a second voltage induced in said second winding part;

said second winding part being arranged such that said second voltage compensates a basic voltage component of said first voltage which is in phase with said exciting voltage, so that the measuring winding provides a total measuring voltage having a relatively large phase shift with respect to said exciting voltage dependent upon instantaneously located material adjacent said pick-up head;

and wherein said exciting winding and said measuring winding are arranged concentrically in relation to one another on a bell shaped core.

2. A pulse generator for the generation of pulses which are synchronously associated with the movement of a mechanical part, comprising:
an element provided with teeth;
a pick-up head having an exciting winding for generating a field, said teeth running past said pick-up head and modulating said field;
means for providing a carrier frequency voltage for exciting said exciting winding;
said pick-up head further including a measuring winding in which said field modulated by said teeth induces a measuring voltage;
circuit means responsive to said measuring voltage for converting said measuring voltage into a pulse sequence, said circuit means including a phase discriminator into which said measuring voltage and said exciting voltage are supplied, said measuring winding including first and second winding parts, one of which being connected in a direction opposite to the other such that said measuring voltage is the voltage difference between a first voltage induced in said first winding part and a second voltage induced in said second winding part;
said second winding part being arranged such that said second voltage compensates a basic voltage component of said first voltage which is in phase with said exciting voltage, so that the measuring winding provides a total measuring voltage having a relatively large phase shift with respect to said exciting voltage dependent upon instantaneously located material adjacent said pick-up head;
and wherein said second part of said measuring winding or a portion thereof is employed as said exciting winding.

3. A pulse generator for the generation of pulses which are synchronously associated with the movement of a mechanical part, comprising:
an element provided with teeth;
a pick-up head having an exciting winding for generating a field, said teeth running past said pick-up head and modulating said field;
means for providing a carrier frequency voltage for exciting said exciting winding;
said pick-up head further including a measuring winding in which said field modulated by said teeth induces a measuring voltage;
circuit means responsive to said masuring voltage for converting said measuring voltage into a pulse sequence, said circuit means including a phase discriminator into which said measuring voltage and said exciting voltage are supplied, said measuring winding including first and second winding parts, one of which being connected in a direction opposite to the other such that said measuring voltage is the voltage difference between a first voltage induced in said first winding part and a second voltage induced in said second winding part;
said second winding part being arranged such that said second voltage compensates a basic voltage component of said first voltage which is in phase with said exciting voltage, so that the measuring winding provides a total measuring voltage having a relatively large phase shift with respect to said exciting voltage dependent upon instantaneously located material adjacent said pick-up head;
wherein one first tooth is made from a material different from the material of the other teeth, whereby when said first tooth passes said pick-up head, said measuring voltage is shifted in its phase position by a predetermined amount relative to the phase position of the measuring voltage resulting when the other teeth pass the pick-up head and wherein said one first tooth consists of an eddy current loss-free, magnetically conductive material and said other teeth consist of an eddy current dissipative material.

4. A pulse generator for the generation of pulses which are synchronously associated with the movement of a mechanical part, comprising:
an element provided with teeth;
a pick-up head having an exciting winding for generating a field, said teeth running past said pick-up head and modulating said field;
means for providing a carrier frequency voltage for exciting said exciting winding;
said pick-up head further including a measuring winding in which said field modulated by said teeth induces a measuring voltage;
circuit means responsive to said measuring voltage for converting said measuring voltage into a pulse sequence, said circuit means including a phase discriminator into which said measuring voltage and said exciting voltage are supplied, said measuring winding including first and second winding parts, one of which being connected in a direction opposite to the other such that said measuring voltage is the voltage difference between a first voltage induced in said first winding part and a second voltage induced in said second winding part;
said second winding part being arranged such that said second voltage compensates a basic voltage component of said first voltage which is in phase with said exciting voltage, so that the measuring winding provides a total measuring voltage having a relatively large phase shift with respect to said exciting voltage dependent upon instantaneously located material adjacent said pick-up head;
wherein the voltage provided at the output of said phase discriminator is supplied to at least one integration element for producing an integration voltage proportional to the keying ratio of said pulse sequence produced by said phase discriminator and wherein two threshold value switches are connected behind the output of said integration element to separate the differing integration voltages.

5. A pulse generator according to claim 4, wherein one of said threshold value switches responds to the maximal values of said integration voltage whereas the other of said threshold value switches responds to the minimal values of said integration voltage.

6. A pulse generator according to claim 4, wherein at least one of said threshold value switches responds, by rectification, to the minimum or maximum values of the integration voltage.

7. A pulse generator for the generation of pulses which are synchronously associated with the movement of a mechanical part, comprising:
   an element provided with teeth;
   a pick-up head having an exciting winding for generating a field, said teeth running past said pick-up head and modulating said field;
   means for providing a carrier frequency voltage for exciting said exciting winding;
   said pick-up head further including a measuring winding in which said field modulated by said teeth induces a measuring voltage;
   circuit means responsive to said measuring voltage for converting said measuring voltage into a pulse sequence, said circuit means including a phase discriminator into which said measuring voltage and said exciting voltage are supplied, said measuring winding including first and second winding parts, one of which being connected in a direction opposite to the other such that said measuring voltage is the voltage difference between a first voltage induced in said first winding part and a second voltage induced in said second winding part;
   said second winding part being arranged such that said second voltage compensates a basic voltage component of said first voltage which is in phase with said exciting voltage, so that the measuring winding provides a total measuring voltage having a relatively large phase shift with respect to said exciting voltage dependent upon instantaneously located material adjacent said pick-up head;
   and wherein said pick-up head comprises a ferrite body having an outer casing part, on which there are located said exciting winding and a central part arranged concentrically with said outer casing part, which carries said first part of said measuring winding.

8. A pulse generator for the generation of pulses which are synchronously associated with the movement of a mechanical part, comprising:
   an element provided with teeth;
   a pick-up head having an exciting winding for generating a field, said teeth running past said pick-up head and modulating said field;
   means for providing a carrier frequency voltage for exciting said exciting winding;
   said pick-up head further including a measuring winding in which said field modulated by said teeth induces a measuring voltage;
   circuit means responsive to said measuring voltage for converting said measuring voltage into a pulse sequence, said circuit means including a phase discriminator into which said measuring voltage and said exciting voltage are supplied, said measuring winding including first and second winding parts, one of which being connected in a direction opposite to the other such that said measuring voltage is the voltage difference between a first voltage induced in said first winding part and a second voltage induced in said second winding part;
   said second winding part being arranged such that said second voltage compensates a basic voltage component of said first voltage which is in phase with said exciting voltage, so that the measuring winding provides a total measuring voltage having a relatively large phase shift with respect to said exciting voltage dependent upon instantaneously located material adjacent said pick-up head;
   and wherein said pick-up head comprises a ferrite body having an outer casing part, on which there are located said second part of said measuring winding, and a central part arranged concentrically with said outer casing part, which carries said first part of said measuring winding.

* * * * *